United States Patent [19]
Aoyagi

[11] Patent Number: 5,943,638
[45] Date of Patent: Aug. 24, 1999

[54] POSITION DETECTING METHOD BY REFLECTED SCATTERED LIGHT OF A LASER BEAM APPLIED TO A POSITION-DETECTED OBJECT

[75] Inventor: Nobuaki Aoyagi, Yamagata, Japan

[73] Assignee: NEC Corporation, Tokyo, Japan

[21] Appl. No.: 08/890,769

[22] Filed: Jul. 11, 1997

[30] Foreign Application Priority Data

Jul. 16, 1996 [JP] Japan .................................. 8-185837

[51] Int. Cl.$^6$ .................................................. G06K 9/00
[52] U.S. Cl. .......................................... 702/150; 382/151
[58] Field of Search ...................... 702/150; 364/167.05, 364/468.21, 468.28; 382/144, 145, 147, 151

[56] References Cited

U.S. PATENT DOCUMENTS

| | | | |
|---|---|---|---|
| 4,814,829 | 3/1989 | Kosugi et al. | 355/43 |
| 5,607,800 | 3/1997 | Ziger | 430/8 |
| 5,717,785 | 2/1998 | Silver | 382/202 |
| 5,737,441 | 4/1998 | Nishi | 382/151 |
| 5,764,536 | 6/1998 | Yamamoto et al. | 364/550 |
| 5,793,901 | 8/1998 | Matsutake et al. | 382/294 |
| 5,822,213 | 10/1998 | Huynh | 364/478.01 |
| 5,825,914 | 10/1998 | Tsuboi et al. | 382/151 |
| 5,832,105 | 11/1998 | Morimoto et al. | 382/151 |
| 5,854,852 | 12/1998 | Csipkes et al. | 382/151 |
| 5,872,862 | 2/1999 | Okubo et al. | 382/151 |
| 5,872,863 | 2/1999 | Tsuboi et al. | 382/151 |
| 5,881,165 | 3/1999 | Tanaka | 382/151 |

FOREIGN PATENT DOCUMENTS

| | | |
|---|---|---|
| 5-109602 | 4/1993 | Japan . |
| 7-218216 | 8/1995 | Japan . |
| 9-82620 | 3/1997 | Japan . |

*Primary Examiner*—Patrick Assouad
*Attorney, Agent, or Firm*—Foley & Lardner

[57] ABSTRACT

A position detecting method of detecting the position of a position-detected object through analysis of the detected signal waveform obtained by detecting a reflected scattered light of a laser beam applied to the position-detected object, comprises a step of calculating an approximate line for approximating a base level on the basis of the portion corresponding to the area other than the alignment mark in the detected signal waveform, a step of calculating a specified straight line on the basis of the points on the detected signal waveform at each slice level obtained by scanning the portion corresponding to the alignment mark in the detected signal waveform at a plurality of slice levels, and a step of detecting the position of the alignment mark by the use of the approximate line for the base level and the specified straight line.

12 Claims, 6 Drawing Sheets

POSITION DETECTING METHOD BY REFLECTED SCATTERED LIGHT OF A LASER BEAM APPLIED TO A POSITION-DETECTED OBJECT

BACKGROUNDS OF THE INVENTION

1. Field of the Invention

The present invention relates to a position calculating method of calculating the position of a position-detected object, on the basis of the detected signal waveform which is obtained by detecting an alignment mark attached to the position-detected object, for use in detecting the position of the position-detected object such as a wafer or the like, for example, in such a photolithographic device as to expose a photoresist in lithography performed during the manufacturing process of a semiconductor device.

2. Description of the Related Art

It is necessary to calculate the accurate position of a semiconductor wafer for the accurate light exposure of a photoresist on the semiconductor wafer, in the technique such as lithography performed during the manufacturing process of a semiconductor device. A slice method, by way of example, is used for describing the conventional calculating method of calculating the position of a semiconductor wafer by detecting an alignment mark attached to a semiconductor wafer.

FIG. 6 shows a scanning waveform and a calculated parameter obtained by the method of detecting an edge scattered light after a laser beam is applied to the alignment mark attached to the semiconductor wafer. FIG. 7 is a flow chart showing an operation of detecting the position of a semiconductor wafer by the use of the conventional slice method.

In FIG. 6, S designates a specified slice level for use in calculating a medial point, A designates an intersection (on the left side) of the specified slice level and the slope, B designates an intersection (on the right side) of the specified slice level and the slope, C designates a mark detecting position (a medial point of A and B), X designates a slope rising point of a signal waveform (on the left side), Y designates a slope rising point of a signal waveform (on the right side), Z designates the accurate position of the alignment mark (a medial point of X and Y), E designates a positioning deviation, $\theta_1$ designates the angle of the slope of the signal waveform (on the left side), and $\theta_2$ designates the angle of the slope of the signal waveform (on the right side).

First of all, smoothing processing is performed on the signal waveform obtained on the basis of the signal intensity of the edge scattered light of the laser beam detected correspondingly to the position on the wafer stage (Step 701). The points A and B on the both sides of the slope of the signal waveform at the slice level S are required assuming that the minimum value of the signal intensity is defined as 0%, and the maximum value thereof is defined as 100% (Step 702). The slice level S may be a level specified beforehand or it may be decided on the basis of the maximum value of the first differential component of the signal waveform slope within the predetermined slice level area. At last, the medial point C of the segment AB is computed, and the position of the point C is obtained as the position for an alignment mark (Step 703).

The detecting processing of an alignment mark by the above-mentioned conventional slice method, has such a defect that a deviation occurs between the correct position of the alignment mark and the detected position thereof when the angles $\theta_1$ and $\theta_2$ on the both sides of the slope of the signal waveform differ from each other. Why it occurs will be described as follows.

The deviation between the angles $\theta_1$ and $\theta_2$ on the both sides of the slope of the signal waveform occurs when the angles of reflection of the light applied to the alignment mark differ between the facing edges of the mark pattern caused by the asymmetrical in the coating state of oxide, nitride, aluminum film or the like and the asymmetrical application state of a photoresist layered on the alignment mark. This asymmetrical phenomenon in the coating state of the film and the application state of the photoresist generally happens point-symmetrically with respect to the center of a wafer and its vicinities. Therefore, the sloping angle of the signal waveform shows a symmetrical characteristic with respect to the center of a wafer.

The correct position of the alignment mark is to stand in the center of the slope-rising areas of the signal waveform. More specifically, assuming that the points reflecting the correct positions of the edges for the alignment mark are defined as X and Y, the correct position of the alignment mark is indicated by the medial point Z of the segment XY in reference to FIG. 6. However, if there is a difference between the angles $\theta_1$ and $\theta_2$ as illustrated in FIG. 6, the higher the slice level becomes, the calculated position C is increasingly deviated from the correct mark position Z under the influence of the difference between the angles $\theta_1$ and $\theta_2$, thereby increasing the positioning deviation $\epsilon$.

While, the slope of the signal waveform has a more unstable shape according as the signal intensity is nearing the base level (0%), so that the slice level must be generally set at 20% or 30% and the more. Therefore, occurrence of the positioning deviation $\epsilon$ is further inevitable in addition to the above-mentioned cause of the positioning deviation $\epsilon$.

The above example has been described in case of the positional detection of a semiconductor wafer by a photolithographic device for exposing a photoresist on the semiconductor wafer to light. However, it is needless to say that the same things happen generally in the various devices for detecting the position of a position-detected object through the analysis of the signal waveform obtained by detecting the reflected scattered light of a laser beam.

SUMMARY OF THE INVENTION

An object of the present invention is to provide a position detecting method capable of detecting the accurate position of a position-detected object while preventing from generating the detected deviation based on the signal processing slice level, regardless of whether the slope of the signal waveform obtained by detecting the reflected scattered light of a laser beam is asymmetrical in the method of detecting the position of a position-detected object by the reflected scattered light of the laser beam applied to the position-detected object.

According to one aspect of the invention, a position detecting method for detecting the position of a position-detected object by detecting the position of an alignment mark attached to the position-detected object through analysis of the detected signal waveform obtained by detecting a reflected scattered light of a laser beam applied to the alignment mark, comprising the steps of:

a step of calculating an approximate line for approximating a base level on the basis of the portion corresponding to the area other than the alignment mark in the detected signal waveform;

a step of calculating a specified straight line on the basis of the points on the detected signal waveform at each slice level which are respectively obtained by scanning the portion corresponding to the alignment mark in the detected signal waveform at a plurality of slice levels; and a step of detecting the position of the alignment mark by the use of the approximate line for the base level and the specified straight line.

The step of calculating the specified straight line may include a step of setting the upper limit and the lower limit of the area where the slope of the detected signal waveform is stable, to make a plurality of scans at a constant interval between the upper limit and the lower limit.

The step of calculating the specified straight line may include a step of calculating medial points of segments connecting the points on the detected signal waveform at every slice level, each segment connecting the points at the same slice level, and a step of calculating an approximate line approximately connecting the medial points at every slice level calculated in the medial point calculation step, the step of detecting the alignment mark may include a step of detecting an intersection of the approximate line of the medial points at every slice level and the approximate line for the base level as the position of the alignment mark.

In the preferred construction, the step of calculating the specified straight line may include a step of setting the upper limit and the lower limit of the area where the slope of the detected signal waveform is stable, to make a plurality of scans at a constant interval between the upper limit and the lower limit, a step of calculating each medial point of each segment connecting the points on the detected signal waveform at the same slice level, with respect to a plurality of slice levels obtained by the step of making a plurality of scans, and a step of calculating an approximate line approximately connecting the medial points at every slice level calculated in the medial point calculation step, the step of detecting the alignment mark may include a step of detecting an intersection of the approximate line of the medial points at every slice level and the approximate line for the base level as the position of the alignment mark.

Also, the step of calculating the specified straight line may include a step of calculating a pair of approximate lines each approximately connecting the points on the detected signal waveform at every slice level, on the both sides of the slope of the detected signal waveform, while the step of detecting the position of the alignment mark may include a step of calculating two intersections of the pair of the approximate lines corresponding to the slope of the detected signal waveform and the approximate line for the base level, and a step of detecting a medial point of a segment connecting the two intersections as the position of the alignment mark.

Also, the step of calculating the specified straight line may include a step of setting the upper limit and the lower limit of the area where the slope of the detected signal waveform is stable, to make a plurality of scans at a constant interval between the upper limit and the lower limit, and a step of calculating a pair of approximate lines each approximately connecting the points on the detected signal waveform at every slice level obtained in the step of making a plurality of scans on the both sides of the slope of the detected signal waveform, while the step of detecting the position of the alignment mark may include a step of calculating two intersections of the pair of the approximate lines corresponding to the slope of the detected signal waveform and the approximate line for the base level, and a step of detecting a medial point of a segment connecting the two intersections as the position of the alignment mark.

According to another aspect of the invention, a COMPUTER READABLE MEMORY storing a position detecting program for controlling a device of detecting the position of a position-detected object by detecting an alignment mark attached to the position-detected object through analysis of the detected signal waveform obtained by detecting a reflected scattered light of a laser beam applied to the alignment mark, the position detecting program comprising the steps of:

calculating an approximate line for approximating a base level on the basis of the portion corresponding to the area other than the alignment mark in the detected signal waveform;

calculating a specified straight line on the basis of the points on the detected signal waveform at each slice level which are respectively obtained by scanning the portion corresponding to the alignment mark in the detected signal waveform at a plurality of slice levels; and detecting the position of the alignment mark by the use of the approximate line for the base level and the specified straight line.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

The following description will be made, by way of example, in case of the positional detection of a semiconductor wafer by a photolithographic device for exposing a photoresist on a semiconductor wafer to light. The present invention, however, is not applied restrictively to a photolithographic device for light exposure of the semiconductor wafer, or the position-detected object is not restricted to a semiconductor wafer. The position detecting method of the present invention can be generally applied to various devices for detecting the position of a position-detected object through the analysis of the signal waveform obtained by detecting a reflected scattered light of a laser beam.

The position detecting method of the present invention is installed in a photolithographic device or the other device and executed in a function executing unit realized by a CPU controlled by a computer program and an internal memory such as a RAM or the like. The computer program is provided, stored in a storing medium such as a magnetic disk, a semiconductor memory, or the like. The function executing unit for executing the position detecting method of the embodiment is realized by loading this computer program in the internal memory.

Figure 1:
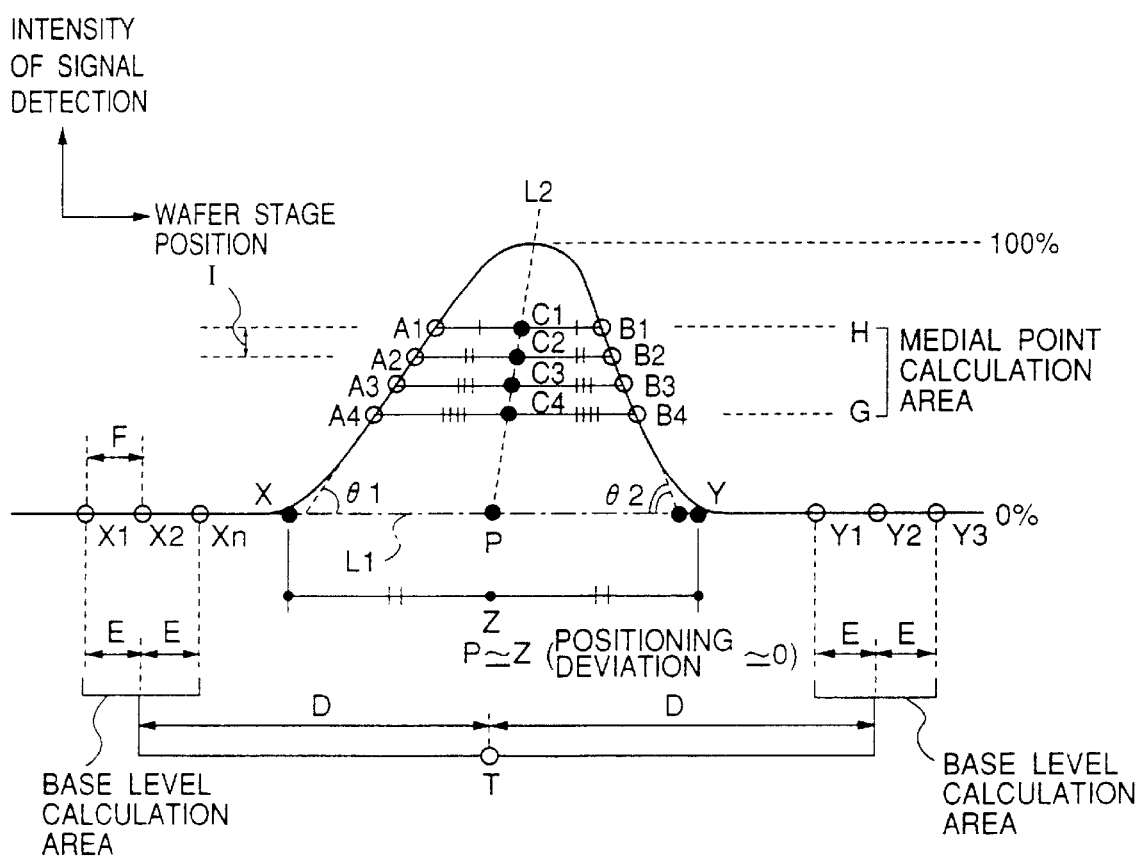
FIG. 1 shows an example of the waveform of a detected signal of a reflected scattered light obtained by a laser beam applied to an alignment mark and a calculating parameter thereof, for use in describing the position detecting method according to an embodiment of the present invention.

FIG. 1 shows an example of a detected signal waveform of a reflected scattered light obtained by a laser beam applied to the alignment mark, for use in describing the position detecting method of a semiconductor wafer according to an embodiment of the present invention.

In FIG. 1, the horizontal direction of a signal waveform corresponds to the position of the stage of a signal detected wafer, and the vertical direction indicates the intensity of the signal detection at the position of each stage. The alignment mark for use in this embodiment is formed on the semiconductor wafer for use in calculating the position of the semiconductor wafer in the light exposure of a photoresist.

In FIG. 1, A1 to An designate the points on the slope (on the left side) at each specified slice level, B1 to Bn designate the points on the slope (on the right side) at each specified slice level, C1 to Cn designate the medial points of the respective segment A1B1 to AnBn, D designates a first specified value of a base level calculation area, E designates a second specified value of the base level calculation area, F designates a sampling interval for calculating the base level, G and H respectively designate the upper limit and the lower limit of the slice level of a medial point calculation area that is a stable area on the both sides of the slope, I designates a slice level scanning interval, X1 to Xn designate sampling points (on the left side) at the signal base level, Y1 to Yn designate sampling points (on the right side) at the signal base level, X designates a point of slope-rising area of the signal waveform (on the left side), Y designates a point of slope-rising area of the signal waveform (on the right side), Z designates the correct position of the alignment mark (the medial point of X and Y), L2 designates an approximate straight line formed by taking approximate values of the signal base level (X1 to Xn, Y1 to Yn), L2 designates an approximate straight line formed by taking approximate values of the medial slope point group (C1 to Cn), T designates a scanning center of the alignment mark, P designates an intersection of L1 and L2, θ1 designates the angle (on the left side) of the slope of the signal waveform, and θ2 designates the angle (on the right side) of the slope of the signal waveform.

Parameters according to the position detecting method of the embodiment are: the position parameters D and E for specifying the area for calculating the base level of the signal intensity (signal intensity outside of the mark area); the sampling interval F at the signal level of the base level calculation area; the sampling points X1 . . . , Xn and Y1 . . . , Yn obtained on the basis of the sampling interval F; the approximate straight line L1 calculated on the basis of these sampling points X1, . . . , Xn and Y1, . . . , Yn; the parameters G and H for specifying the range of the slice level for indicating the area for calculating the medial point group out of the signal waveform slope; the scanning interval I between the slice levels G and H; the points A1, . . . , An and B1, . . . , Bn on the signal waveform at each slice level; the medial point group C1, . . . ,Cn of the segments connecting the respective points at each slice level obtained on the basis of these points A1, . . . ,An and B1, . . . , Bn; and the approximate straight line L2 calculated on the basis of the medial point group C1, . . . , Cn. The position of the point P, that is an intersection of the line L1 and L2, is obtained as the detected position of the alignment mark according to the embodiment.

This time, when there is a difference between the angles θ1 and θ2 respectively made by the signal base level and each side of the slope of the signal waveform as illustrated in FIG. 1, the positional relationship between the detected signal waveform and the actual alignment mark (relationship between the actual alignment mark and X, Y, and Z) will be described with reference to FIG. 3 that is a supplementary view.

Figure 3:
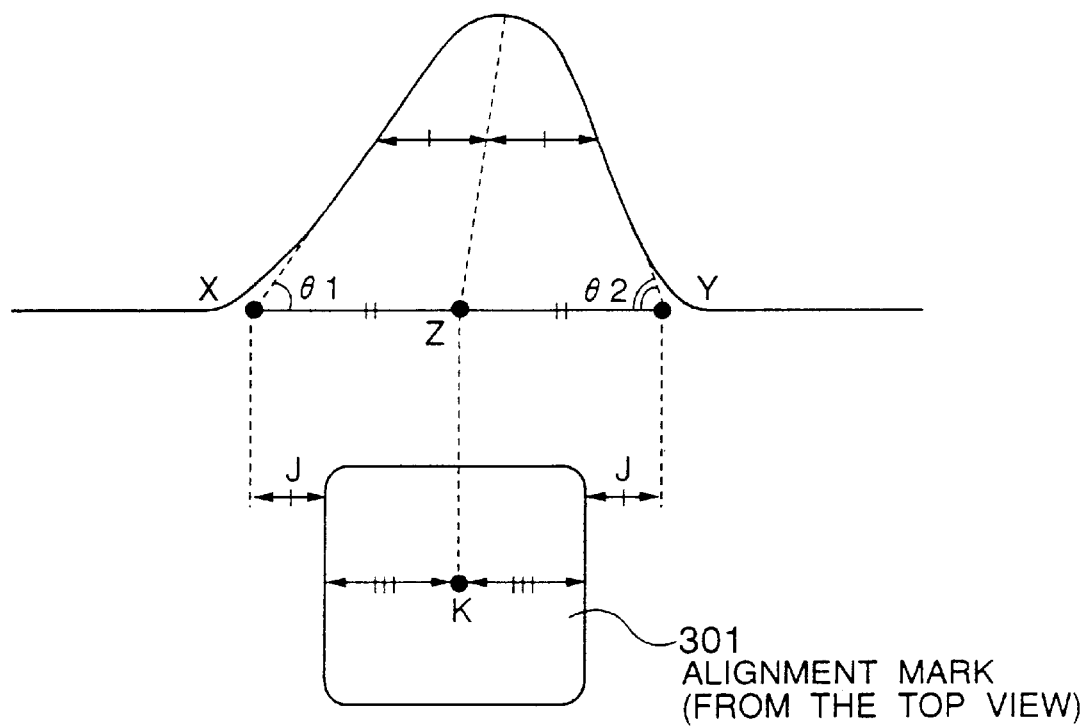
FIG. 3 is a view showing the correspondence between the alignment mark and the signal waveform according to the embodiment.

FIG. 3 shows the correspondence between the state of the alignment mark 301 of a right lattice from the top view of a semiconductor wafer and the signal waveform detected through scanning the alignment mark 301 in the horizontal direction.

In FIG. 3, the point K indicates the center of the alignment mark and the correct position. The points X and Y indicate the points in the rising areas of the signal waveform slope, and they are positioned away from the edges on the both sides of the alignment mark 301 by a certain distance, from a view of the positional relationship about the alignment mark 301.

The distance J is offset by the rising area of the signal waveform and the mark edge, which is produced by the width of the light source of a detection optical system. More specifically, even if the points X and Y are in the relation of θ1≠θ2, in other words, even if the signal intensity in the central portion of the mark varies asymmetrically, the edge portions of the mark are correctly reflected in the points under the constant offset on the both sides. Therefore, it is possible to detect the correct position of the center K of the alignment mark 301 by calculating the medial point Z of the points X and Y accurately. For the calculation of the point Z, it is useful to require an intersection of the bisector of the stable area within the both slopes and the base line including X and Y.

Figure 2:
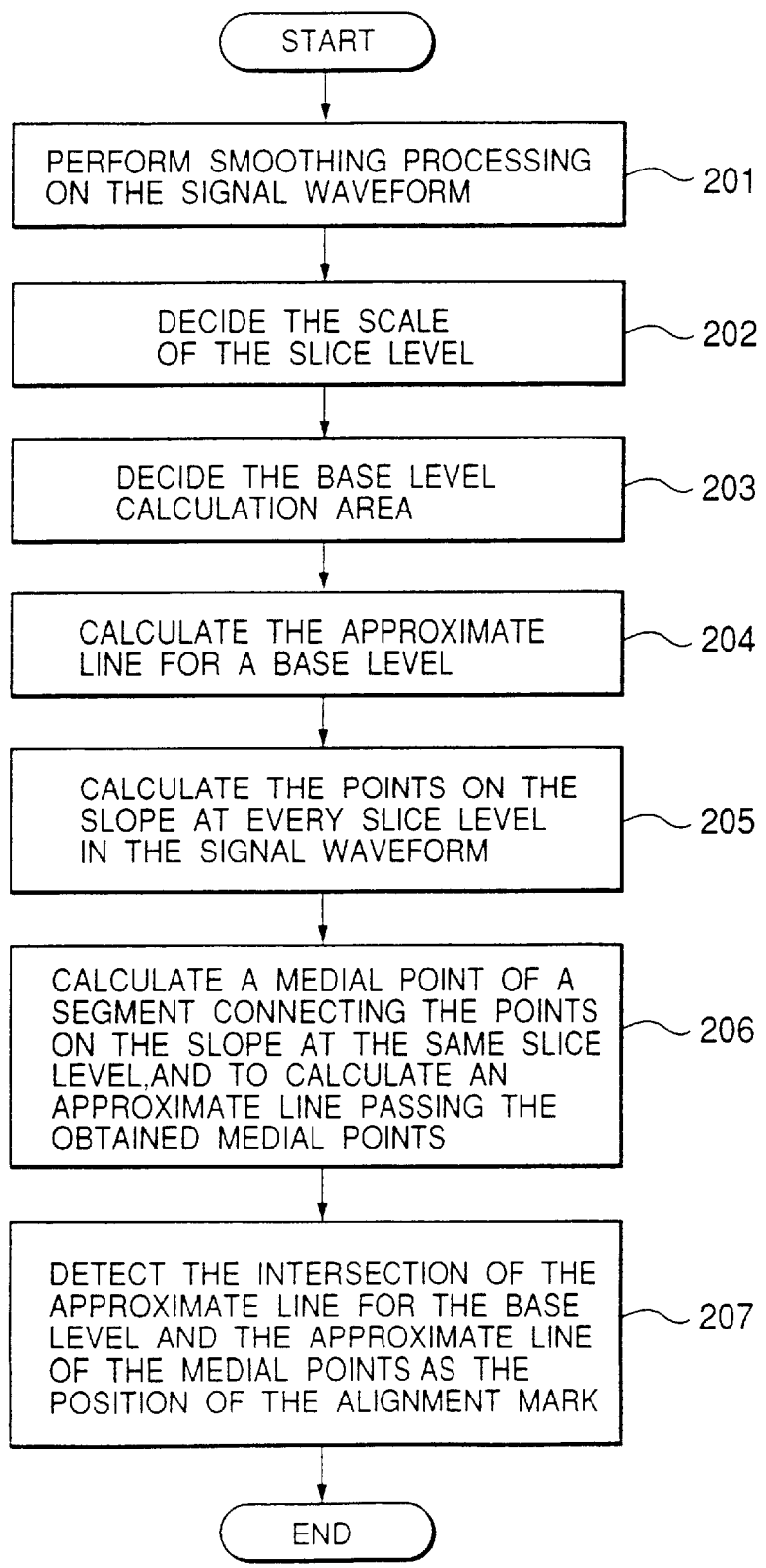
FIG. 2 is a flow chart showing the movement of the processing according to the embodiment.

This time, a detecting operation of the alignment mark according to the embodiment will be described with reference to the flow chart of FIG. 2.

First of all, smoothing processing is performed on the signal waveform based on the signal intensity of a reflected scattered light of a laser beam, which is detected correspondingly to the position of a semiconductor wafer (Step 201).

Assuming that the minimum value of the signal intensity is defined as 0%, and the maximum value thereof is defined as 100%, the scale of the slice level for use in the signal waveform processing is decided (Step 202).

Subsequently, positions that are distant from the scanning center T in the optical system for detecting the alignment mark by the distance D on the both sides, are required. Each signal processing area is required by the range defined by the distance E on the both sides from each of the obtained points, which is regarded as a base level calculation area (Step 203). The scanning center T is the center of the scanning width as well as the temporary center in each alignment mark decided by the roughly positioning sequence for the coordinates reference following the mechanical pre-alignment of a semiconductor wafer.

This time, the signal level detecting points X1, . . . , Xn (on the left side) and Y1, . . . , Yn (on the right side) on the signal waveform are required at every interval of pitch F in the base level calculation area obtained in Step 203, and the approximate straight line L1 (line approximation) passing all the points X1, . . . , Xn and Y1, . . . , Yn is calculated (Step 204).

Subsequently, while scanning the configuration stable area of the signal waveform slope within the specified range G to H by the specified slice levels at every interval of pitch I, the points on the slope of the signal waveform are defined as A1, . . . , An (on the left side) and B1, . . . , Bn (on the right side) (Step 205). The medial points C1, . . . , Cn of the segments A1B1, . . . , AnBn connecting the respective points on the both sides of the slope with each other at the same slice level, are calculated, and the approximate straight line L2 (line approximation) passing the obtained C1, . . . , Cn is calculated (Step 206).

At last, the intersection P of the approximate straight lines L1 and L2 is calculated, and the positional coordinates of the intersection P is detected as the center position of the alignment mark (Step 207).

As mentioned above, the position detecting method of the present invention calculates the medial point of the rising area by the use of the straight line connecting the points calculated on the both sides of the slope at every signal processing slice level, in the stable area within the both slopes of the detected signal waveform for the alignment mark. Therefore, even if there is a difference between the angles of the both slopes, it is possible to prevent from generating detection deviation based on the signal processing slice level, as well as to prevent from the detection accuracy being influenced by the configuration stability of the signal waveform in the slope-rising area.

Next, another embodiment of the present invention will be described.

Figure 4:
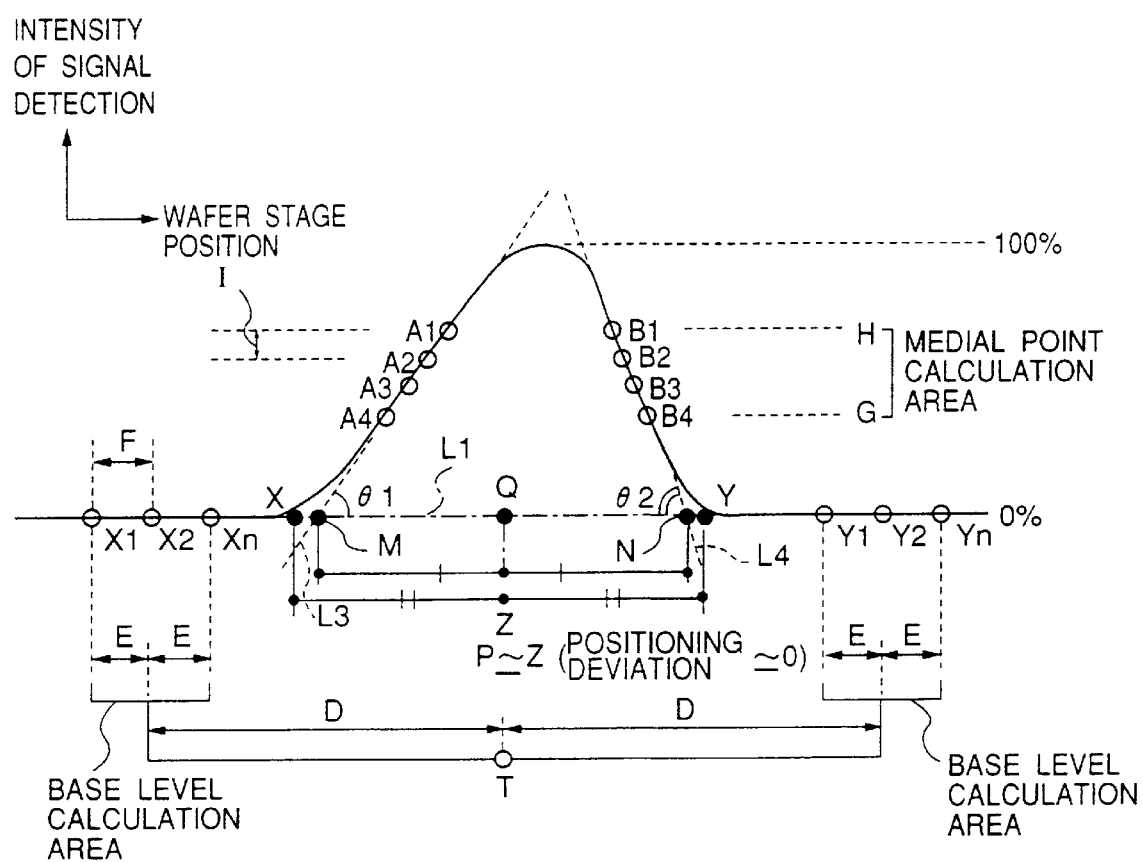
FIG. 4 shows an example of the waveform of a detected signal of a reflected scattered light obtained by a laser beam applied to an alignment mark and a calculating parameter thereof, for use in describing the position detecting method according to another embodiment of the present invention.

FIG. 4 shows an example of the detected signal waveform of a reflected scattered light obtained by a laser beam applied to the alignment mark, for use in describing the position detecting method of a semiconductor wafer, according to another embodiment of the present invention. FIG. 4 uses the identical symbols with FIG. 1 with respect to the same or similar element relative to the detection signal waveform (that is, the elements other than the medial points M, N and the straight lines L3 and L4). The straight line L3 is an approximate line formed by the approximate value of the points A1 to An on the slope of the signal waveform, the straight line L4 is an approximate line formed by the approximate value of the points B1 to Bn on the slope of the signal waveform, the point M is an intersection of the straight lines L1 and L3, and the point N is an intersection of the straight lines L1 and L4.

Figure 5:
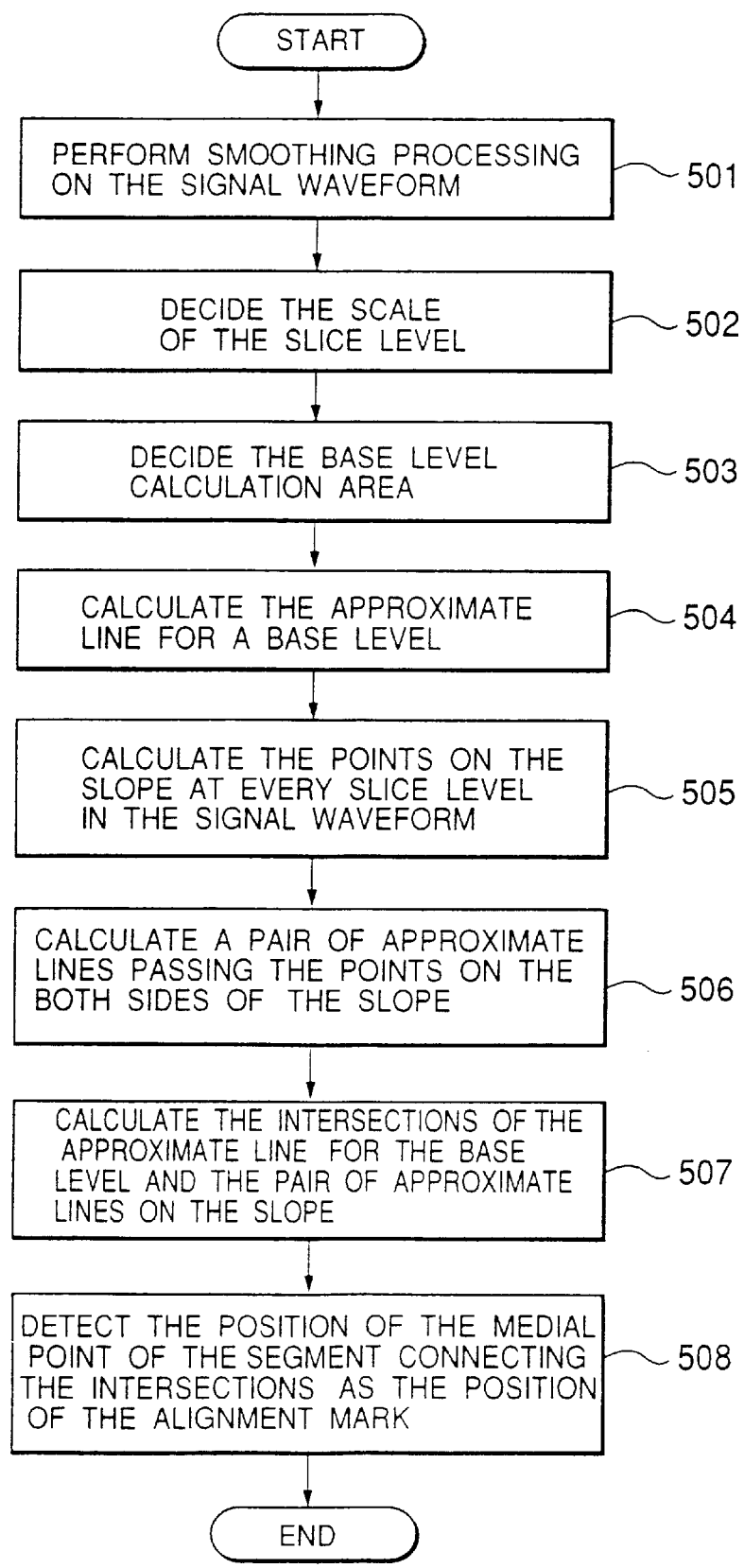
FIG. 5 is a flow chart showing the movement of the processing according to the embodiment.
Figure 6:
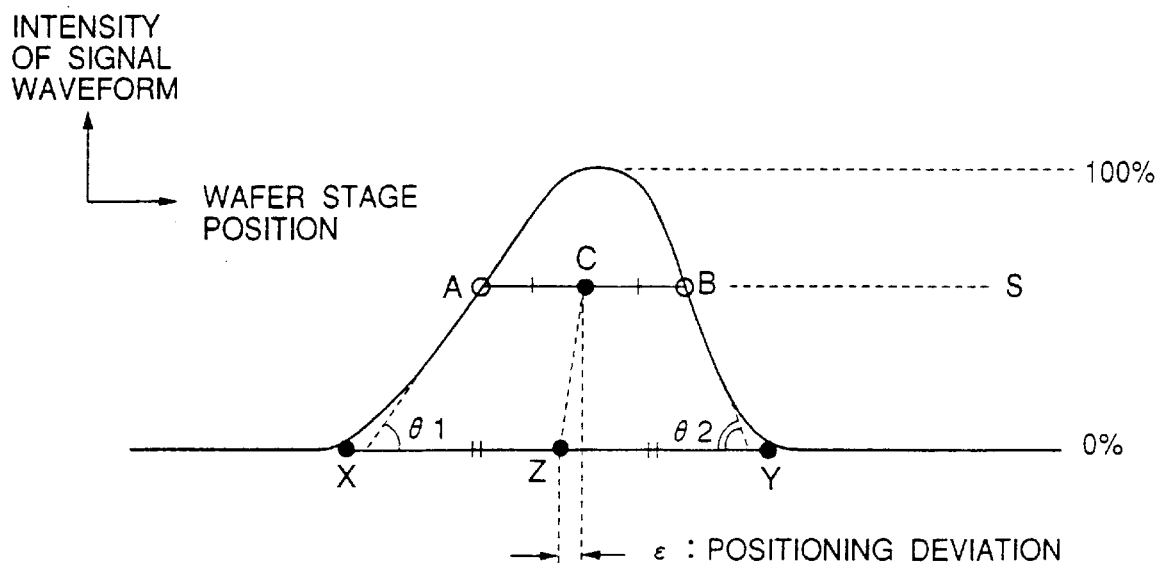
FIG. 6 shows an example of the waveform of a detected signal of a reflected scattered light obtained by a laser beam applied to an alignment mark and a calculating parameter thereof, for use in describing the conventional position detecting method.
Figure 7:
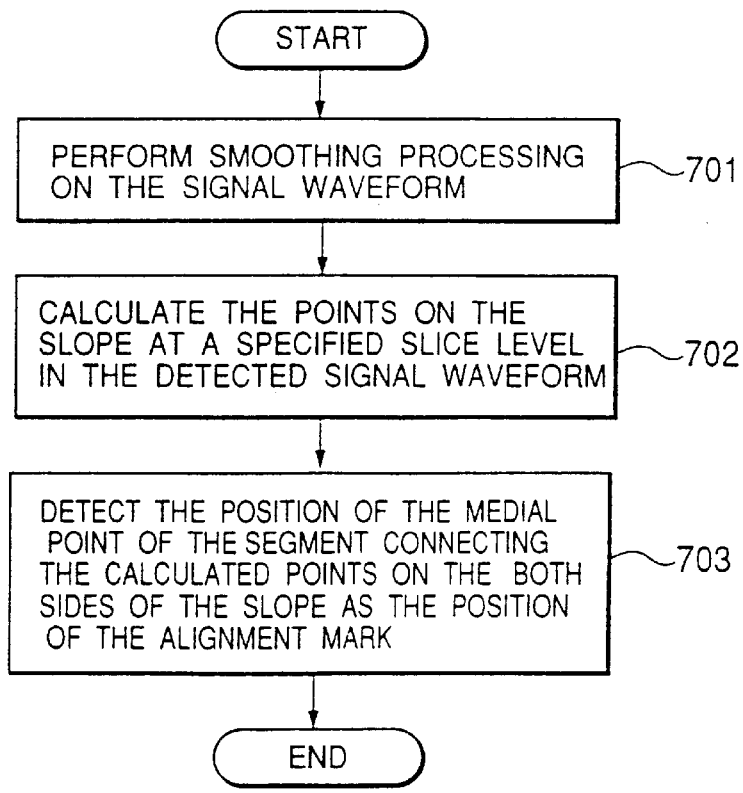
FIG. 7 is a flow chart showing the movement of the processing according to the conventional position detecting method.

FIG. 5 is a flow chart showing a detecting operation of an alignment mark according to the embodiment. In FIG. 5, the operation from Step 501 to Step 505 is similar to the operation from Step 201 to Step 205 in the first embodiment as illustrated in FIG. 2.

In this embodiment, after calculation of the points A1, . . . , An (on the left side) and the points B1, . . . , Bn (on the right side) on the slopes of the signal waveform (Step 505), the approximate line L3 is calculated by taking the approximate value of the points A1, . . . , An, and the approximate line L4 is calculated by taking the approximate value of the points B1, . . . , Bn (Step 506). The intersection M of the approximate line L1 and the approximate line L3, and the intersection N of the approximate line L1 and the approximate line L4 are calculated (Step 507), thereafter a medial point G of the segment MN connecting the points M and N is detected as the position for the alignment mark (Step 508).

As mentioned above, in the position detecting method according to the embodiment, the stable area within the detected signal waveform for the alignment mark is approximated by the straight line on the both sides of the slope, and the medial point between the slope-rising areas is calculated by the use of these lines. Therefore, even if there is a difference between the angles of the both slopes, it is possible to prevent from generating detection deviation based on the signal processing slice level, and to prevent form the detection accuracy being influenced by the configuration stability of the signal waveform within the slope-rising area.

As mentioned-above, the position detecting method of the embodiment is adopted not only to the photolithographic device for the light exposure of a semiconductor wafer, but also, needless to say, to various general devices for detecting the position of a position-detected object by the analysis of the signal waveform obtained through detecting a reflected scattered light of a laser beam.

As set forth hereinabove, the position detecting method by the use of the reflected scattered light of a laser beam applied to the position-detected object, according to the present invention, calculates a medial point between the slope-rising areas by the use of a plurality of slice levels in the stable area within the both sides of the slope of the detected signal waveform for the alignment mark. Therefore, even if the slope of the detected waveform is asymmetric, it is possible to prevent from generating the detection deviation based on the signal processing slice level and to detect the accurate position of an alignment mark, thereby improving the accuracy in detecting the position of a position-detected object.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A position detecting method for detecting the position of a position-detected object by detecting the position of an alignment mark attached to the position-detected object through analysis of the detected signal waveform obtained by detecting a reflected scattered light of a laser beam applied to the alignment mark, comprising the steps of:

a step of calculating an approximate line for approximating a base level on the basis of the portion corresponding to the area other than the alignment mark in the detected signal waveform;

a step of calculating a specified straight line on the basis of the points on the detected signal waveform at each slice level which are respectively obtained by scanning the portion corresponding to the alignment mark in the detected signal waveform at a plurality of slice levels; and a step of detecting the position of the alignment mark by the use of the approximate line for the base level and the specified straight line.

2. A position detecting method as set forth in claim 1, wherein said step of calculating the specified straight line including a step of setting the upper limit and the lower limit of the area where the slope of the detected signal waveform is stable, to make a plurality of scans at a constant interval between the upper limit and the lower limit.

3. A position detecting method as set forth in claim 1, wherein said step of calculating the specified straight line including a step of calculating medial points of segments connecting the points on the detected signal waveform at every slice level, each segment connecting the points at the same slice level, and a step of calculating an approximate line approximately connecting the medial points at every slice level calculated in said medial point calculation step, said step of detecting the alignment mark including a step of detecting an intersection of the approximate line of the medial points at every slice level and the approximate line for the base level as the position of the alignment mark.

4. A position detecting method as set forth in claim 1, wherein said step of calculating the specified straight line including a step of setting the upper limit and the lower limit of the area where the slope of the detected signal waveform is stable, to make a plurality of scans at a constant interval between the upper limit and the lower limit, a step of calculating each medial point of each segment connecting the points on the detected signal waveform at the same slice level, with respect to a plurality of slice levels obtained by said step of making a plurality of scans, and a step of calculating an approximate line approximately connecting the medial points at every slice level calculated in said medial point calculation step, said step of detecting the alignment mark including a step of detecting an intersection of the approximate line of the medial points at every slice level and the approximate line for the base level as the position of the alignment mark.

5. A position detecting method as set forth in claim 1, wherein said step of calculating the specified straight line including a step of calculating a pair of approximate lines each approximately connecting the points on the detected signal waveform at every slice level, on the both sides of the slope of the detected signal waveform, while said step of detecting the position of the alignment mark including a step of calculating two intersections of the pair of the approximate lines corresponding to the slope of the detected signal waveform and the approximate line for the base level, and a step of detecting a medial point of a segment connecting the two intersections as the position of the alignment mark.

6. A position detecting method as set forth in claim 1, wherein said step of calculating the specified straight line including a step of setting the upper limit and the lower limit of the area where the slope of the detected signal waveform is stable, to make a plurality of scans at a constant interval between the upper limit and the lower limit, and a step of calculating a pair of approximate lines each approximately connecting the points on the detected signal waveform at every slice level obtained in said step of making a plurality of scans on the both sides of the slope of the detected signal waveform, while said step of detecting the position of the alignment mark including a step of calculating two intersections of the pair of the approximate lines corresponding to the slope of the detected signal waveform and the approximate line for the base level, and a step of detecting a medial point of a segment connecting the two intersections as the position of the alignment mark.

7. A COMPUTER READABLE MEMORY storing a position detecting program for controlling a device of detecting the position of a position-detected object by detecting an alignment mark attached to the position-detected object through analysis of the detected signal waveform obtained by detecting a reflected scattered light of a laser beam applied to the alignment mark, said position detecting program comprising the steps of:

calculating an approximate line for approximating a base level on the basis of the portion corresponding to the area other than the alignment mark in the detected signal waveform;

calculating a specified straight line on the basis of the points on the detected signal waveform at each slice level which are respectively obtained by scanning the portion corresponding to the alignment mark in the detected signal waveform at a plurality of slice levels; and detecting the position of the alignment mark by the use of the approximate line for the base level and the specified straight line.

8. A COMPUTER READABLE MEMORY as set forth in claim 7, wherein said step of calculating the specified straight line in said position detecting program including setting the upper limit and the lower limit of the area where the slope of the detected signal waveform is stable, to make a plurality of scans at a constant interval between the upper limit and the lower limit.

9. A COMPUTER READABLE MEMORY as set forth in claim 7, wherein said step of calculating the specified straight line in said position detecting program including calculating medial points of segments connecting the points on the detected signal waveform at every slice level, each segment connecting the points at the same slice level, and calculating an approximate line approximately connecting the medial points at every slice level calculated in said medial point calculation step, while said step of detecting the alignment mark including detecting an intersection of the approximate line of the medial points at every slice level and the approximate line of the base level as the position of the alignment mark.

10. A COMPUTER READABLE MEMORY as set forth in claim 7, wherein said step of calculating the specified straight line in said position detecting program including setting the upper limit and the lower limit of the area where the slope of the detected signal waveform is stable, to make a plurality of scans at a constant interval between the upper limit and the lower limit, calculating each medial point of each segment connecting the points on the detected signal waveform at the same slice level, with respect to a plurality of slice levels obtained by said step of making a plurality of scans, and calculating an approximate line approximately connecting the medial points at every slice level calculated in said medial point calculation step, while said step of detecting the alignment mark including detecting an intersection of the approximate line of the medial points at every slice level and the approximate line of the base level as the position of the alignment mark.

11. A COMPUTER READABLE MEMORY as set forth in claim 7, wherein said step of calculating the specified straight line in said position detecting program including calculating a pair of approximate lines each approximately connecting the points on the detected signal waveform at every slice level, on the both sides of the slope of the detected signal waveform, while said step of detecting the position of the alignment mark including calculating two intersections of the pair of the approximate lines corresponding to the slope of the detected signal waveform and the approximate line for the base level, and detecting a medial point of a segment connecting the two intersections as the position of the alignment mark.

12. A COMPUTER READABLE MEMORY as set forth in claim 7, in which said step of calculating the specified straight line in said position detecting program includes a step of setting the upper limit and the lower limit of the area where the slope of the detected signal waveform is stable, to make a plurality of scans at a constant interval between the upper limit and the lower limit, and a step of calculating a pair of approximate lines each approximately connecting the points on the detected signal waveform at every slice level obtained in said step of making a plurality of scans on the both sides of the slope of the detected signal waveform, while said step of detecting the position of the alignment mark includes a step of calculating two intersections of the pair of the approximate lines corresponding to the slope of the detected signal waveform and the approximate line for the base level, and a step of detecting a medial point of a segment connecting the two intersections as the position of the alignment mark.

* * * * *